United States Patent
Bernet et al.

(10) Patent No.: US 9,621,072 B2
(45) Date of Patent: Apr. 11, 2017

(54) METHOD FOR OPERATING A MULTI-PHASE MODULAR MULTI-LEVEL POWER CONVERTER

(71) Applicant: Siemens Aktiengesellschaft, Munich (DE)

(72) Inventors: Steffen Bernet, Radeberg (DE); Hans Bärnklau, Dresden (DE); Albrecht Gensior, Dresden (DE); Steffen Rohner, Sinsheim (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 102 days.

(21) Appl. No.: 14/378,545

(22) PCT Filed: Jan. 22, 2013

(86) PCT No.: PCT/EP2013/051081
§ 371 (c)(1),
(2) Date: Aug. 13, 2014

(87) PCT Pub. No.: WO2013/120664
PCT Pub. Date: Aug. 22, 2013

(65) Prior Publication Data
US 2015/0049532 A1 Feb. 19, 2015

(30) Foreign Application Priority Data
Feb. 14, 2012 (DE) .................. 10 2012 202 173

(51) Int. Cl.
*H02M 7/5387* (2007.01)
*H02M 7/483* (2007.01)

(52) U.S. Cl.
CPC ......... *H02M 7/5387* (2013.01); *H02M 7/483* (2013.01); *H02M 2007/4835* (2013.01)

(58) Field of Classification Search
CPC . H02M 2007/4835; H02M 2001/0003; H02M 7/19; H02M 7/49
See application file for complete search history.

(56) References Cited

U.S. PATENT DOCUMENTS 3,860,858 A * 1/1975 Nola ............... H02P 27/045
 318/801
5,329,222 A * 7/1994 Gyugyi ............... H02J 3/1814
 307/102

(Continued)

FOREIGN PATENT DOCUMENTS

CA 27 76 859 A1 4/2011
CN 101594045 A 12/2009

(Continued)

OTHER PUBLICATIONS

Modulares Stromrichterkonzept für Netzkupplungsanwendung bei hohen Spannungen; R. Marquardt, A. Lesnicar, J. Hildinge ETG-Tagung 2002; 2002.

(Continued)

*Primary Examiner* — Timothy J Dole
*Assistant Examiner* — Yusef Ahmed
(74) *Attorney, Agent, or Firm* — Henry M. Feierenisen LLC.

(57) ABSTRACT

A method for operating a multi-phase modular power inverter having DC input terminals and AC phase voltage output terminals connected to a load, phase modules connected between the DC input terminals, with each phase module composed of valve arms connected in series at a connection point forming an AC phase voltage output terminal which is connected to a load, each valve arm having a plurality of power inverter cells with turn-off semiconductor switches and a choke connected in series, includes controlling, with a control device, the turn-off semiconductor switches of each power inverter cell as a function of a (Continued)

plurality of setpoint values, wherein the setpoint values are generated such that a time-averaged energy value stored in a capacitor of a corresponding power inverter cells is predetermined by an operating point of the load and-or an operating mode of the modular multi-level power inverter.

9 Claims, 6 Drawing Sheets

(56) References Cited

U.S. PATENT DOCUMENTS

| | | | | |
|---|---|---|---|---|
| 5,889,667 A * | 3/1999 | Bernet | ............... | H02M 7/797 323/239 |
| 5,949,664 A * | 9/1999 | Bernet | ............... | H02M 1/34 363/34 |
| 6,519,169 B1* | 2/2003 | Asplund | ............... | H02M 7/48 363/132 |
| 6,611,442 B2* | 8/2003 | Hanaoka | ............... | H02M 1/4233 363/125 |
| 7,471,529 B2* | 12/2008 | Jin | ............... | H02J 3/1842 323/237 |
| 8,130,523 B2* | 3/2012 | Benesch | ............... | H02J 3/1892 363/127 |
| 8,837,185 B2* | 9/2014 | Goerges | ............... | H02M 7/53873 307/151 |
| 9,130,458 B2* | 9/2015 | Crookes | ............... | H02J 3/1835 |
| 2002/0110006 A1* | 8/2002 | Mao | ............... | H02M 3/33569 363/21.06 |
| 2002/0175644 A1* | 11/2002 | Su | ............... | H02M 7/483 318/400.23 |
| 2003/0026111 A1* | 2/2003 | Steimer | ............... | H02M 7/49 363/16 |
| 2004/0165868 A1* | 8/2004 | Sato | ............... | B60L 11/1803 388/804 |
| 2005/0169018 A1* | 8/2005 | Hatai | ............... | H02M 7/53871 363/37 |
| 2008/0310205 A1* | 12/2008 | Hiller | ............... | H02M 7/483 363/131 |
| 2009/0021081 A1* | 1/2009 | Jacobson | ............... | H02M 1/42 307/77 |
| 2009/0128117 A1* | 5/2009 | Ochiai | ............... | B60L 11/1851 323/299 |
| 2010/0020577 A1* | 1/2010 | Dommaschk | ............... | H02M 7/19 363/63 |
| 2010/0060235 A1* | 3/2010 | Dommaschk | ............... | H02M 7/483 320/128 |
| 2010/0067266 A1* | 3/2010 | Dommaschk | ............... | H02M 7/483 363/64 |
| 2010/0118453 A1* | 5/2010 | Dorn | ............... | H01H 79/00 361/54 |
| 2010/0118578 A1* | 5/2010 | Dommaschk | ............... | H02M 7/483 363/127 |
| 2010/0321038 A1* | 12/2010 | Dommaschk | ............... | H02M 7/483 324/658 |
| 2012/0068555 A1* | 3/2012 | Aiello | ............... | H02M 7/483 307/115 |
| 2012/0081939 A1* | 4/2012 | Hasler | ............... | H02J 3/1857 363/126 |
| 2012/0170338 A1* | 7/2012 | Trainer | ............... | H02M 7/483 363/127 |
| 2012/0314466 A1* | 12/2012 | Goerges | ............... | H02M 7/53873 363/78 |
| 2013/0094264 A1* | 4/2013 | Crookes | ............... | H02J 3/1835 363/127 |
| 2013/0234681 A1* | 9/2013 | Aiello | ............... | G05F 3/08 323/208 |
| 2014/0104899 A1* | 4/2014 | Fischer | ............... | H02M 7/72 363/39 |
| 2015/0162848 A1* | 6/2015 | Harnefors | ............... | H02J 3/1814 363/78 |
| 2015/0194885 A1* | 7/2015 | Baernklau | ............... | H02M 7/483 323/271 |

FOREIGN PATENT DOCUMENTS

| | | |
|---|---|---|
| CN | 101860203 A | 10/2010 |
| CN | 102118019 A | 7/2011 |
| CN | 102130619 A | 7/2011 |
| DE | 101 03 031 A1 | 7/2002 |
| DE | 10 2008 014 898 A1 | 9/2009 |
| DE | 10 2011 006 988 A1 | 10/2012 |
| WO | WO 2008/067785 A1 | 6/2008 |
| WO | WO 2011/127983 A1 | 10/2011 |

OTHER PUBLICATIONS

New Concept for High Voltage—Modular Multilevel Converter; R. Marquardt, A. Lesnicar Proc. of IEEE-Power Electronics Specialists Conference (PESC), Aachen 2004; DE.

Control of the Modular Multi-Level Converter for Minimized Cell Capacitance; Stefan P. Engel, Rik W. De Donker 14th European Conference on Power Electronics and Applications (EPE 2011), Birmingham, United Kingdom, Aug. 30-Sep. 1, 2011, pp. 3640-4550; 2011; GB.

On Dynamics and Voltage Control of the Modular Multilevel Converter; Antonios Antonopoulos, Lennart Ängquist, Hans-Peter Nee European Power Electronics Conference (EPE), Barcelona, Spanien, 8.-10, Sep. 2009, pp. 2815-3521; 2009; ES.

Classification, Terminology and Application of the Modular Multilevel Cascade Converter (MMCC); Hirofumi Akagi; 2011.

"Untersuchung des Modularen Mehrpunktstromrichters M2C für Mittelspannungsanwendungen" Steffen Rohner, Dissertation, Feb. 25, 2011, pp. FP-158, XP002686297, Universität Dresden, gefunden im Internet URL:http://www.qucosa.de/fileadmin/data/qucosa/documents/6931/dissertation_steffen_rohner_02.06.11.pdf (gefunden am Oct. 29, 2012), pp. 13-19, pp. 43-48, pp. 133-136, pp. 148-157; 2011; DE; Feb. 25, 2011.

Wang, Kui et al. "Voltage Ripple Principle and Restrain Method of Floating Capacitors in a New Modular Multilevel Converter" Transactions of China Electrotechnical Society, vol. 26, No. 5, 2011.

Wang, Kui et al. "Voltage balancing control for a modular multilevel converter" Journal of Tsinghua University (Science and Technology) vol. 51, No. 7, 2011.

* cited by examiner

METHOD FOR OPERATING A MULTI-PHASE MODULAR MULTI-LEVEL POWER CONVERTER

CROSS-REFERENCES TO RELATED APPLICATIONS

This application is the U.S. National Stage of International Application No. PCT/EP2013/051081, filed Jan. 22, 2013, which designated the U.S. and has been published as International Publication No. WO 2013/120664 and which claims the priority of German Patent Application, Ser. No. 10 2012 202 173.6, Feb. 14, 2012, pursuant to 35 U.S.C. 119(a)-(d).

BACKGROUND OF THE INVENTION

The invention relates to a method for operating a multi-phase modular multi-level power converter having a load connected to the AC voltage terminals thereof.

The topology of a modular multi-level power converter is known from DE 101 03 031A1. In the literature, the modular multi-level power converter is also termed an M2C or also an M2LC (Modular MultiLevel Converter). Like a cascaded H-bridge converter, this modular multi-level power converter is classed as a cell converter. In the publication entitled "New Concept for High Voltage—Modular Multi-level Converter", by R. Marquardt and A. Lesnicar, published for the PESC 2004 Conference in Aachen, the main types of multi-level power converter are analyzed in respect of industrial implementation and compared with one another, wherein the use of a modular multi-level power converter in a back-to-back intertie application is also proposed.

In contrast to a cascaded H-bridge converter, the power converter cells of a modular multi-level power converter as disclosed in DE 101 03 031A1 each have a half-bridge comprised of two series-connected turn-off semiconductor switches, in particular Insulated-Gate Bipolar Transistors (IGBTs), wherein an energy store implemented as a DC capacitor is provided for the storage of energy.

According to the older national patent application with official application number 10 2011 006 988.7, such a DC capacitor comprises a large number of commercially available capacitors, in particular electrolytic capacitors, which are connected in parallel and/or in series. Instead of electrolytic capacitors, film capacitors can also be used. This high capacitor count results in an increased space requirement for a power converter having a large number of converter cells, causing increased design and mechanical complexity.

According to DE 101 03 031A1, each phase module of a modular multi-level power converter has a large number of series-connected power converter cells which are also termed submodules. It is advantageous if the power converter cells of a phase module are symmetrically distributed over its two valve arms. In contrast to the cascaded H-bridge converter, the submodule capacitors are not charged by separate diode rectifiers, but via the connection to the DC link. Due to the connection of the electrically series-connected submodules of a phase module, e.g. of a three-phase modular multi-level power converter on the DC bus, for symmetrical operation within the six valve arms a module voltage according to the following equation:

$$\bar{u}_{Kli,j} = \frac{1}{T_0}\int_0^{T_0} u_{Kli,j} dt = \frac{u_d}{2N} \approx \frac{U_d}{2N} \quad (1)$$

where i=1, 2, ... 6 and j=1, 2, ... N must be present, averaged over time, at the terminals of each submodule. For typical applications of a modular multi-level power converter, the load current has a well-pronounced fundamental component. As the load current flows proportionately through the modules within a phase module, it follows from the product of terminal voltage $u_{Kli,j}$ and valve arm current $i_{zi}$ according to the following equation $$p_{Kli,j} = u_{Kli,j} i_{zi} \quad (2)$$

and equation (1) that energy variations in the fundamental frequency are very pronounced in the capacitors. In particular these fundamental frequency components of the energy are extremely important for dimensioning the capacitors. The fundamental frequency voltage components make it necessary, among other things, to install high-value capacitors. These high capacitance values are achieved by connecting a plurality of capacitors in parallel. This high capacitor count, described for a two-pad power converter cell of the already mentioned national patent application with official application number 10 2011 006 988.7, leads to an increased power converter space requirement, resulting in a high degree of design and mechanical complexity and increased safety requirements.

Important figures for comparing different voltage converter topologies are the energy $W_{C,ges}$ capacitively stored in the converter, referred to the maximum apparent power $S_{Max}$ ($S_{Max}$ can also be an operand), according to the equation:

$$k_{JproVA} = \frac{W_{C,ges}}{S_{Max}} \quad (3)$$

and the energy $W_{CMax,ges}$ capacitively storable in the power converter according to the equation:

$$k_{JproVA,Max} = \frac{W_{CMax,ges}}{S_{Max}} \quad (4)$$

wherein energy $W_{CMax,ges}$ capacitively storable in the power converter is calculated using the following equation:

$$W_{CMax,ges} = \sum_{i=1}^{6}\sum_{j=1}^{N}\frac{1}{2}C_{SMi,j}U_{NCi,j}^2 \quad (5)$$

where $U_{NCi,j}$ is the rated voltages of the capacitors.

For medium voltage applications, typical values for $k_{JproVA}$ (equation (3)) of a 3-level voltage converter are 6 ... 9 kJ/MVA. In the case of the modular multi-level power converter, the values for $k_{JproVA}$ and therefore of the stored energy are likely to be considerably higher.

A high stored or storable energy in the power converter is disadvantageous both for cost reasons (capacitor costs, space requirement, ...) and on safety grounds. Both could limit possible fields of application for the modular multi-level power converter.

Reducing the capacitor cost/complexity of a modular multi-level power converter, particularly of a three-phase converter, could open up new fields of applications for the multi-level power converter.

The first question to be answered is how to dimension the capacitors of the power converter cells of, for example, a three-phase modular multi-level power converter.

Relevant to the dimensioning are requirements such as
permissible maximum/minimum voltage of the capacitors,
permissible losses in the capacitors, and possibly permissible ripple voltage.

A submodule energy $\overline{w}_{Ci,j}$ stored over a period $T_0$ averaged over time is calculated according to the following equation:

$$\overline{w}_{Ci,j} = \frac{1}{T_0} \int_0^{T_0} \frac{1}{2} C_{SMi,j} u_{Ci,j}^2 dt \quad (6)$$

A capacitively stored energy $w_{C,ges}$ of the power converter is determined according to the equation:

$$w_{C,ges} = \sum_{i=1}^{6} \sum_{j=1}^{N} \frac{1}{2} C_{SMi,j} u_{Ci,j}^2 \quad (7)$$

The publication "Modulares Stromrichterkonzept für Netzkupplungsanwendung bei hohen Spannungen" ("Modular power converter concept for high-voltage grid intertie applications") by Rainer Marquardt, Anton Lesnicar and Jürgen Hildinger, reproduced in the proceedings of the ETG Conference 2002, Bad Nauheim, April 2002, and "Control of the Modular Multi-Level Converter for Minimized Cell Capacitance", by Stephan P. Engel and Rik W. De Doncker, reproduced in the conference proceedings of the 14th European Conference on Power Electronics and Applications (EPE 2011), Birmingham, UK, 30 Aug.-1 Sep. 2011, pp. 4351-4360, each present a control method whereby the energy stores of the power converter cells of a multi-level power converter can be minimized. In both of these publications, back-to-back intertie operation is quoted as an application.

In the publication "On Dynamics and Voltage Control of the Modular Multilevel Converter" by Antonios Antonopoulos, Lennart Ängquist and Hans-Peter Nee, reproduced in the proceedings of the 13th European Conference on Power Electronics and Applications (EPE 2009), Barcelona, Spain, 8-10 Sep. 2009, pp. 3353-3362, a control method for a modular multi-level power converter is presented with which a reduction in the average capacitor voltage—and therefore in the energy stored, averaged over time, as a function of the load voltage—is achieved. Cited as a positive effect are reduced switching losses and higher permissible voltage ripple in the capacitors.

The invention is based on the insight that the energy $w_{Ci,j}$ stored in the capacitors has a time-dependent component $\tilde{w}_{Ci,j}$ and a constant component $\overline{w}_{Ci,j}$ at a steady-state operating point. The time-dependent component $\tilde{w}_{Ci,j}$ of the energy stored in the capacitor is determined by the operating mode of the modular multi-level power converter or more specifically of the load connected thereto. Influencing factors include the operating point of the load, the shape of the common-mode voltage as well as internal "circulating currents".

SUMMARY OF THE INVENTION

The object of the invention is now to specify a method for operating a multi-phase modular multi-level power converter whereby the capacitor cost/complexity of the multi-phase modular multi-level power converter is reduced.

This object is achieved by the open-/closed-loop control of the energy stored in the capacitors of the power converter cells of a multi-phase modular multi-level power converter as a function of an operating point of a load and/or of the operating mode of the power converter.

In an advantageous embodiment of a modular multi-level power converter, a plurality of values of stored energies with their associated operating points and of values of stored energies with their associated operating modes of the power converter are stored in a table. A setpoint generator of a control system of the multi-level power converter accesses this table by feeding a known or determined operating point of the load or a known or determined operating mode of the multi-level power converter into this table and reading out from this table an associated stored energy value which is used for setpoint generation.

The setpoints which are calculated online or offline as a function of an operating point of a load and/or of the operating mode of the modular multi-level power converter are predefined for all the power converter cells of the modular multi-level power converter or for the power converter cells of each valve arm of said modular multi-level power converter.

For using this inventive method for operating a multi-phase modular multi-level power converter, the energies stored averaged over time in the submodule capacitors are controlled in an open-/closed-loop manner as a function of an operating point of a connected load and/or of an operating mode of the modular multi-level power converter. As a result, lower capacitance values of the power converter cells of a modular multi-level power converter are possible than when using a known method of operation in which the energies stored in the submodule capacitors are constant.

BRIEF DESCRIPTION OF THE DRAWING

For further explanation of the invention, reference is made to the accompanying drawings on the basis of which the method according to the invention will now be explained in greater detail.

DETAILED DESCRIPTION OF PREFERRED EMBODIMENTS

Figure 1:
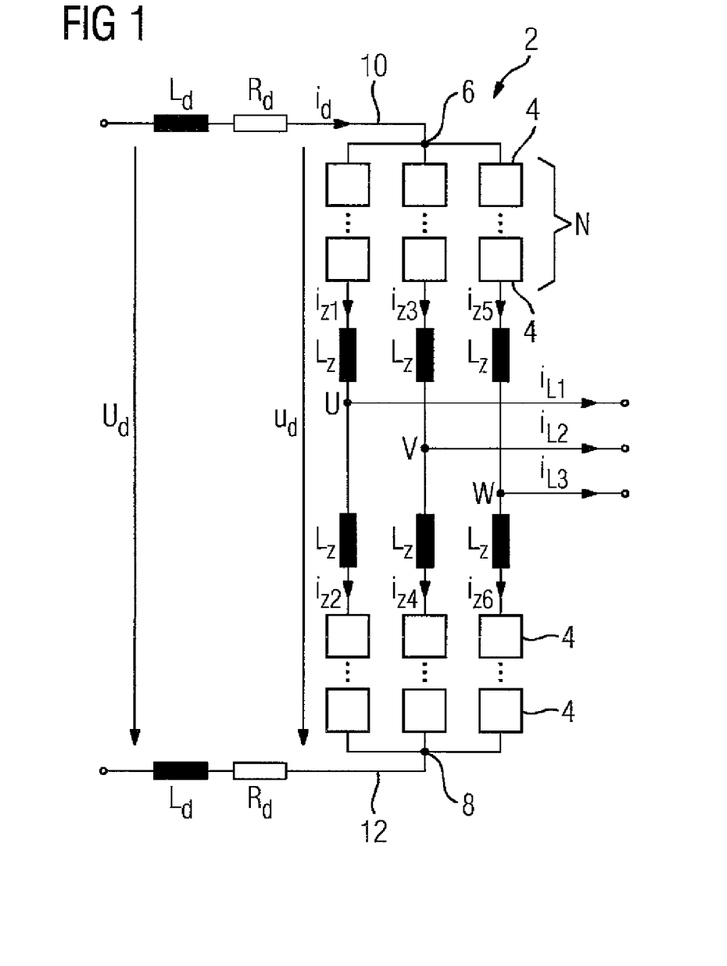
FIG. 1 schematically illustrates a three-phase modular multi-level power converter having N power converter cells per valve arm for operating a load (not shown in greater detail), FIG. 2 schematically illustrates the design of a power converter cell of the modular multi-level power converter according to FIG. 1.

The three-phase modular multi-level power converter 2 schematically illustrated in FIG. 1 has N series-connected power converter cells 4 per valve arm. In addition, each valve arm of this three-phase modular multi-level power converter 2 has a choke $L_Z$ which is connected in series with the N series-connected power converter cells 4. Every two valve arms are connected in series with a phase module, wherein a connection point of two valve arms of a phase module constitutes an AC voltage terminal U, V or W respectively of the three-phase modular multi-level power converter 2, to which terminals a load (not shown in greater detail) is connected. The load can be an electric motor, in particular a three-phase AC motor, or a power grid with which energy can be exchanged in both directions. The two chokes $L_Z$ of each phase module can also be magnetically coupled.

These three phase modules are connected in parallel, wherein an upper node constitutes a positive DC voltage terminal 6 and a lower node a negative DC voltage terminal 8 of the three-phase modular multi-level power converter 2. A positive busbar 10 of a DC bus is connected to the DC voltage terminal 6 of the three-phase modular multi-level power converter 2, the negative busbar 12 of said DC bus being linked to the DC voltage terminal 8 of the three-phase modular multi-level power converter 2. This DC bus connects the three-phase modular multi-level power converter 2 on the DC voltage side to a DC voltage source (not shown in greater detail) at which the DC voltage $U_d$ is present.

An adjustable DC voltage $u_d$ is dropped across the phase modules of the three-phase modular multi-level power converter 2. During balanced operation of this power converter 2, the time-averaged terminal voltage:

$$\overline{u}_{Kli,j} = \frac{1}{T_0} \int_0^{T_0} u_{Kli,j} dt = \frac{u_d}{2N} \approx \frac{U_d}{2N} \quad (1)$$

is present at the terminals of each submodule 4 of a valve arm.

Figure 2:
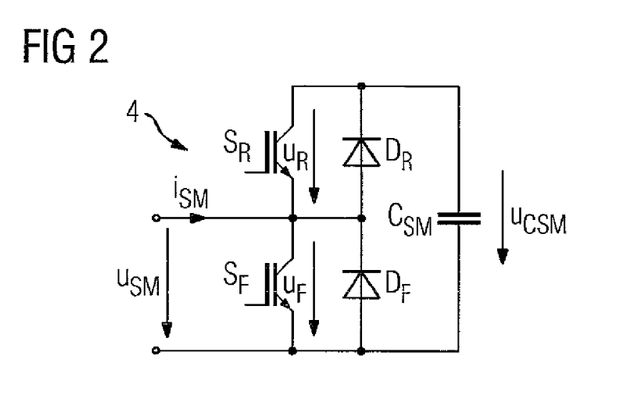

The design of a power converter cell 4 of a modular multi-level power converter according to DE 101 03 031 A1 is schematically illustrated in FIG. 2. This power converter cell 4 has a half-bridge comprising two series-connected turn-off semiconductor switches $S_R$ and $S_F$, with insulated-gate bipolar transistors (IGBTs) preferably being used as turn-off semiconductor switches $S_R$ and $S_F$. However, any commercially available power semiconductors can be used as turn-off semiconductor switches of each submodule. The selection criterion is the cell voltage. Each turn-off semiconductor switch $S_R$ and $S_F$ has an associated freewheeling diode $D_R$ and $D_F$ respectively connected in antiparallel therewith. Connected in parallel with this semiconductor bridge is a capacitive energy store $C_{SM}$ implemented from a plurality of commercially available capacitors connected in parallel and/or in series. In the national older patent application with official application number 10 2011 006 988.7, a capacitor unit of a power converter cell is presented in greater detail. The connection point of the two turn-off semiconductor switches $S_R$ and $S_F$ constitutes a connecting terminal of a power converter cell 4 of the modular multi-level power converter 2, whereas a negative terminal of the capacitive energy store $C_{SM}$, which is electrically connected to an emitter terminal of the turn-off semiconductor switch $S_F$, constitutes a second connecting terminal of this power converter cell 4. In DE 101 03 031A1, a second embodiment of a power converter cell 4 of a modular multi-level power converter is presented in greater detail. This published unexamined German patent application discloses which switching states are possible and how they can be achieved.

Figure 3:
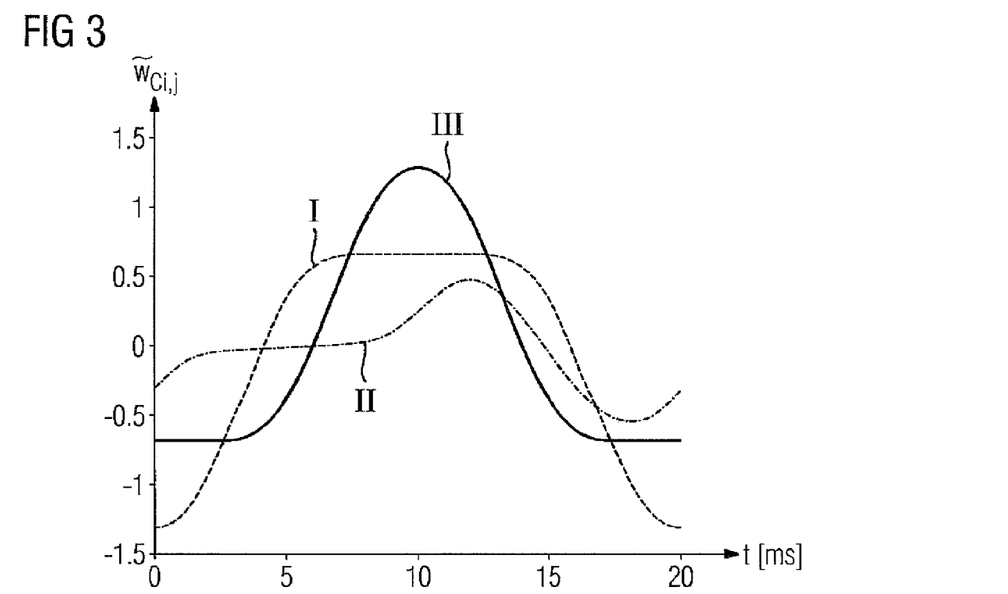
FIG. 3 shows three waveforms, plotted against time t, of time-dependent components of a capacitor energy of a power converter cell of the multi-level power converter according to FIG. 1 for three different load angles $\phi_{L1}$, $\phi_{L2}$, $\phi_{L3}$.

The invention is based on the insight that, at steady-state (periodic) operating points, the stored energy of each power converter cell 4 has a time-dependent component $\tilde{w}_{Ci,j}$ and a component $\overline{w}_{Ci,j}$ that is constant averaged over time. This constant component $\overline{w}_{Ci,j}$ corresponds to the (arithmetic) mean of the capacitor energy $w_{Ci,j}$. The time-dependent component $\tilde{w}_{Ci,j}$ of the capacitor energy $w_{Ci,j}$ is determined by the operating mode of the modular multi-level power converter 2 and/or of the operating point of the load. In FIG. 3, waveforms of three time-dependent components $\tilde{w}_{Ci,j}$ of a capacitor energy $w_{Ci,j}$ are shown, plotted against time t, for different load angles $\phi_{L1}$, $\phi_{L2}$ and $\phi_{L3}$ at the same (sinusoidal) load current $i_L$, the same (sinusoidal) line-to-neutral voltage of the load $u_{LN}$ and constant fundamental frequency $f_o$. The curve I shows the time-dependent component $\tilde{w}_{Ci,j}$ for the load angle $\phi_{L1}=-90°$, the curve II the time-dependent component $\tilde{w}_{Ci,j}$ for the load angle $\phi_{L2}=0°$ and the curve III shows the time-dependent component $\tilde{w}_{Ci,j}$ of a stored energy $w_{Ci,j}$ of a power converter cell 4 for the load angle $\phi_{L3}=+90°$.

In the following, only the essential relationships for the dimensioning of the capacitors within fixed voltage limits will be specified. For the purposes of further consideration it will be assumed, for simplicity, that the extreme values $U_{MinCi,j}$ and $U_{MaxCi,j}$ of the permissible capacitor voltage $u_{Ci,j}$ are independent of the operation of the power converter 2.

If the extreme values $U_{MinCi,j}$ and $U_{MaxCi,j}$ of the permissible capacitor voltage $u_{Ci,j}$ are known, the minimum value of the capacitance $C_{SMi,j}$ at constant energy $\overline{w}_{Ci,j}$ is given by $$C_{SMi,j} \geq C_{SM,Mind,ki,j} = \frac{2\Delta W^+_{Maxi,j}}{U^2_{MaxCi,j} - U^2_{MinCi,j}} \quad (8)$$

with the difference between the extreme values $U_{MinCi,j}$ and $U_{MaxCi,j}$ of the energy fluctuation over all the (dimensioning-relevant) operating points AP $$\Delta W^+_{Maxi,j} = \max_{AP}\{\tilde{w}_{Ci,j}\} - \min_{AP}\{\tilde{w}_{Ci,j}\} \quad (9)$$

If, on the other hand, the stored energy $\overline{w}_{Ci,j}$ averaged over time is dependent on the operating point AP of the load and/or the operating mode of the modular multi-level power converter, the minimum value of the capacitance $C_{SMi,j}$ is given by $$C_{SMi,j} \geq C_{SM,Mind,v_{i,j}} = \frac{2\Delta W_{Maxi,j}}{U_{MaxCi,j}^2 - U_{MinCi,j}^2} \quad (10)$$

with $$\Delta W_{Maxi,j} = \max_{AP}\{\max_{t \in T_0}\{\tilde{w}_{Ci,j}\} - \min_{t \in T_0}\{\tilde{w}_{Ci,j}\}\} \quad (11)$$

Because $\Delta W_{Maxi,j} \leq \Delta W_{Maxi,j}^+$, it follows that $$C_{Mind,v_{i,j}} \leq C_{Mind,k_{i,j}}$$

Therefore, if an energy $\overline{w}_{Ci,j}$ is dependent on the operating point AP of a load of the three-phase modular multi-level power converter 2 and/or the operating mode of said power converter 2, lower capacitance values are possible than in the case of constant energy $\overline{w}_{Ci,j}$.

Figure 4:
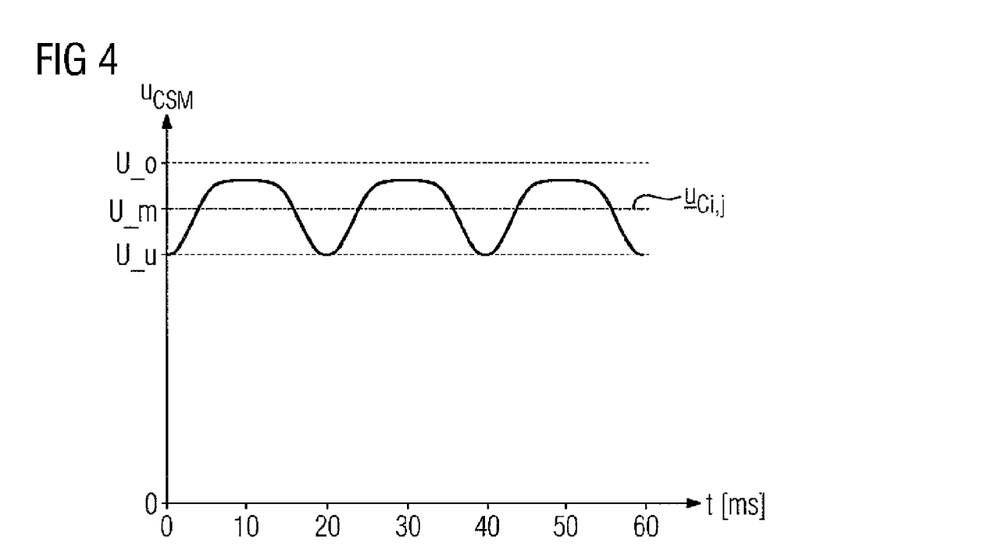
FIG. 4 shows a waveform, plotted against time t, of a capacitor voltage of a power converter cell of the modular multi-level power converter according to FIG. 1 as a function of a load angle $\phi_{L1}=-90°$ without using the method according to the invention.
Figure 5:
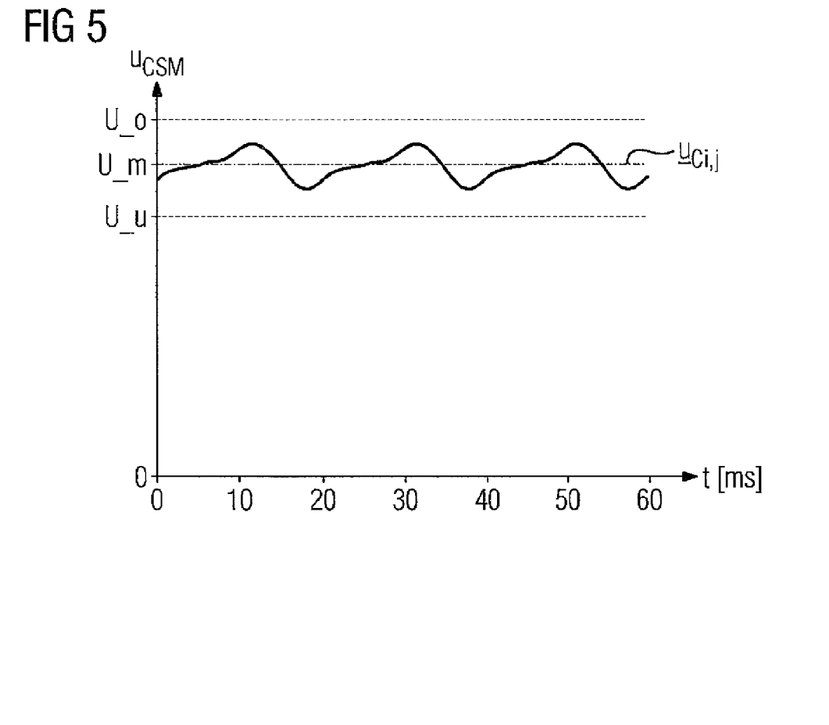
FIG. 5 shows this waveform, plotted against time t, as a function of a load angle $\phi_{L2}=0°$ without using the method according to the invention.
Figure 6:
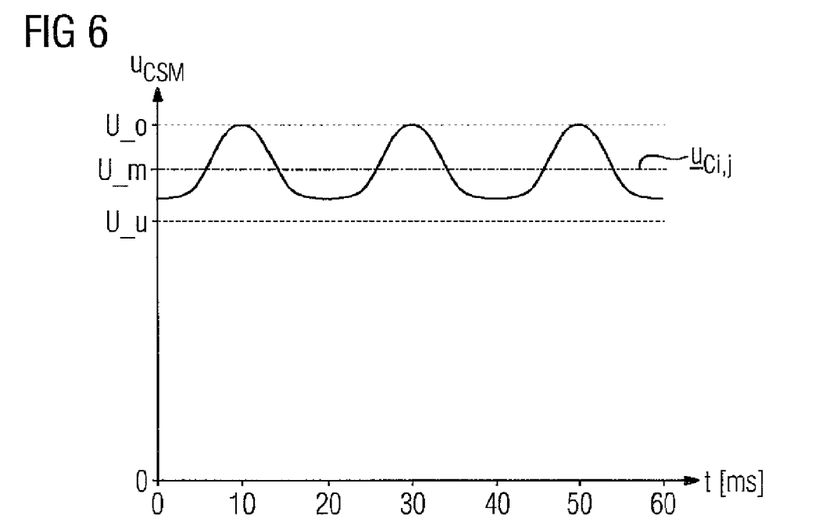
FIG. 6 shows this waveform, plotted against time t, as a function of a load angle $\phi_{L3}=+90°$ without using the method according to the invention.

The graphs in FIGS. 4, 5 and 6 show in each case the waveform of the capacitor voltage $u_{CSM}$ of a submodule 4 of the three-phase modular multi-level power converter 2 according to FIG. 1 as a function of the load angle $\phi_{L1}=-90°$, $\phi_{L2}=0°$ and $\phi L3=+90°$, wherein the average value of the capacitor energy $\overline{w}_{Ci,j}$ is constant. This average value of the capacitor energy $\overline{w}_{Ci,j}$ is indicated by the capacitor voltage $\underline{u}_{Ci,j}$ in this graph, wherein the average value of the capacitor energy $\overline{w}_{Ci,j}$ and of the capacitor voltage $\underline{u}_{Ci,j}$ are related by the following equation:

$$\underline{u}_{Ci,j} = \sqrt{2/C_{SMi,j}\overline{w}_{Ci,j}} \quad (13)$$

The capacitors $C_{SMi,j}$ of the submodules 4 of the two-phase multi-level power converter 2 are dimensioned in the conventional manner and have a capacitance value $C_I$.

Figure 7:
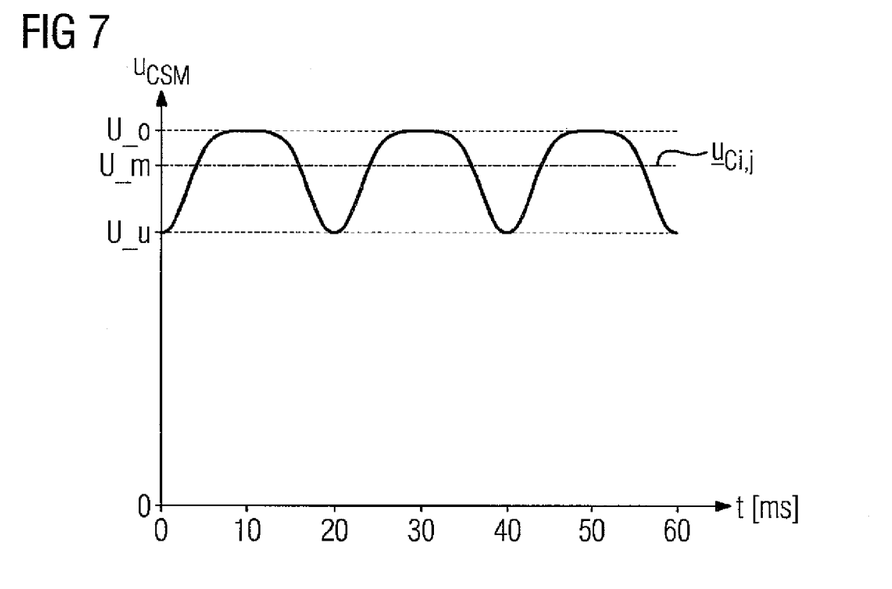
FIGS. 7-9 show the waveforms from FIGS. 4 to 6, plotted against time t, which result from using the method according to the invention.
Figure 8:
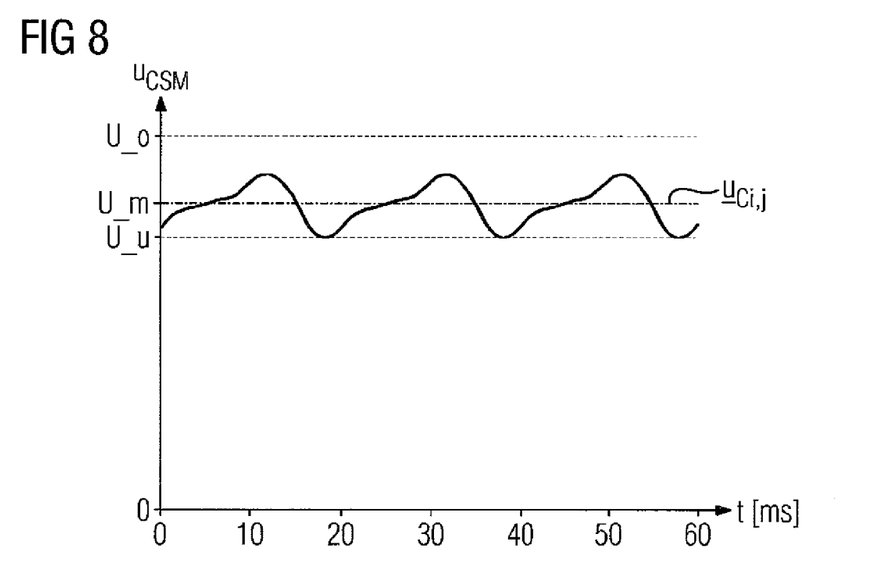
Figure 9:
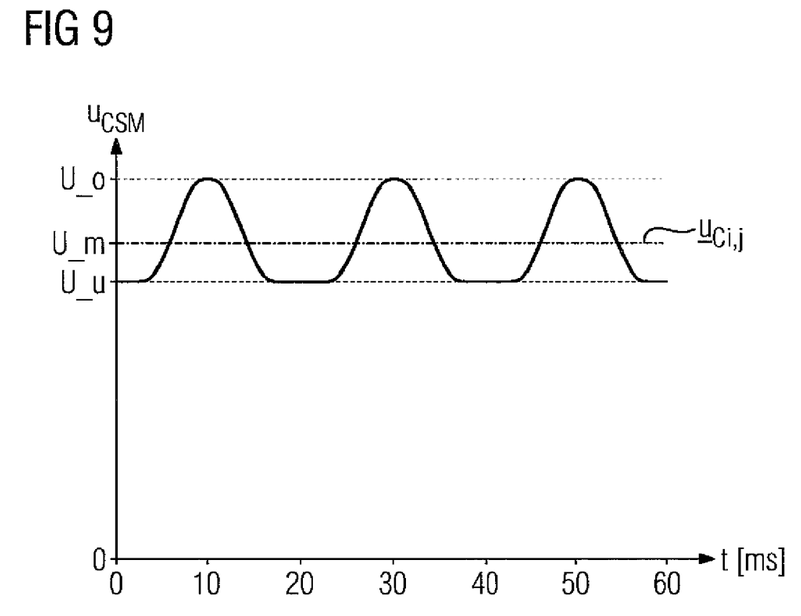

The graphs in FIGS. 7, 8 and 9 each show a waveform of a capacitor voltage $u_{CSM}$ of a submodule 4 of the three-phase modular multi-level power converter 2 from FIG. 1 as a function of the load angles $\phi_{L1}=-90°$, $\phi_{L2}=0°$ and $\phi_{L3}=+90°$, wherein the average value of the capacitor energy $\overline{w}_{Ci,j}$ is dependent on the operating point AP. For comparison with the waveforms in FIGS. 4, 5 and 6, in the graphs in FIGS. 7, 8 and 9 the value $\underline{u}_C$ is plotted to indicate the average value of the capacitor energy $\overline{w}_{Ci,j}$. Due to the fact that the average value of the capacitor energy $\overline{w}_{Ci,j}$ is now open-/closed-loop controlled as a function of the operating point AP, there is produced for the capacitors $C_{SM}$ of the submodules 4 of the three-phase modular multi-level power converter 2 from FIG. 1 a capacitance value $C_{II}$ which only corresponds to part of the capacitance value $C_I$, e.g. $C_{II}$=0.77 $C_I$, of the conventional dimensioning. This reduces the capacitor cost/complexity of the submodules 4 of a three-phase modular multi-level power converter 2, reducing not only the size of these submodules 4 but also that of the modular multi-level power converter 2. This also reduces the mechanical and design complexity for implementing a three-phase, modular multi-level power converter 2 according to FIG. 1.

In order to be able to use this method according to the invention, a known control device of a three-phase modular multi-level power converter 2, which is disclosed in WO2008/067785 A1, must be modified accordingly.

Figure 10:
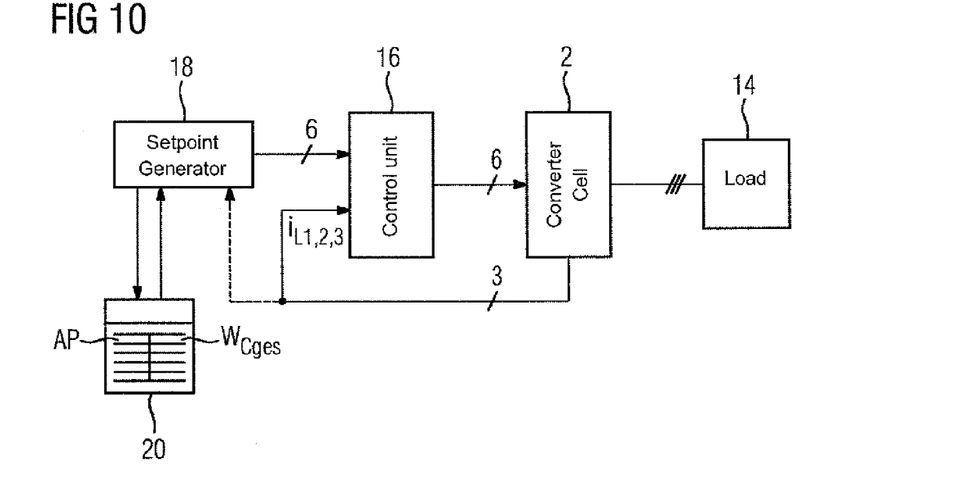
FIG. 10 shows a block diagram of a circuit arrangement whereby the method according to the invention is implemented.

Such a control device according to the invention is shown in greater detail in FIG. 10. There, 2 denotes the modular multi-level power converter from FIG. 1, 14 a load connected to said multi-level power converter 2, 16 a control unit, in particular a current control unit, 18 a setpoint generator, and 20 a storage unit. From setpoint and actual values, the control unit 16 generates e.g. the load currents $i_{L1}$, $i_{L2}$ and $i_{L3}$, and an arm voltage setpoint value for each valve arm. The block 2 also comprises, in addition to the power converter circuit according to FIG. 1, a control unit for each valve arm. From an arm voltage setpoint value, each control unit generates control signals for the turn-off semiconductor switches $S_R$ and $S_F$ of each power converter cell 4 of a valve arm. The setpoint values are generated by the setpoint generator 18 as a function of a speed setpoint, for example, wherein in the case of the method of WO2008/067785A1 the time average of the capacitor energy $\overline{w}_{Ci,j}$ of each submodule 4 is approximately constant for all the operating points AP.

According to the inventive method, these setpoints are generated such that the time averages of the capacitor energy $\overline{w}_{Ci,j}$ are varied as a function of the operating points AP of the load 14 and/or of the operating mode of the modular multi-level power converter 2. For this purpose, each setpoint generator 18 is assigned a storage unit 20 in which a table is stored which has a load for each operating point AP and an associated value of an average value of the capacitor energy $\overline{w}_{Ci,j}$ of a submodule 4 for each operating mode of the multi-level power converter 2. The setpoint generator 18 transmits an instantaneous operating point AP of the load 14 and/or a value of the operating mode of the modular multi-level power converter 2 to the storage unit 20. Depending on this operating point AP and/or the operating mode, an associated average value of the capacitor energy $\overline{w}_{Ci,j}$ of a submodule 4 of the modular multi-level power converter 2 is read out and processed in the setpoint generator 18 to generate setpoints for the control device 16. According to the control device in FIG. 5 of WO2008/067785 A1, the control unit 16 receives, for example, setpoint values for an active current, a reactive current, a DC voltage or rather a direct current. In addition, a setpoint value for a valve arm voltage is fed to the setpoint generator 18.

Instead of average values of the capacitor energy $\overline{w}_{Ci,j}$, values of the capacitor voltage $\underline{u}_{Ci,j}$ or values for the energy $w_{Ciges}$ capacitively stored in the multi-level power converter 2 for each operating point AP of the load 14 and/or operating mode of the modular multi-level power converter 2 can also be stored in the table stored in the storage unit 20. As already explained, the capacitor energy $w_{Ci,j}$ and the capacitor voltage $u_{Ci,j}$ are related according to the following equation $$\underline{u}_{Ci,j} = \sqrt{2/C_{SMi,j}\overline{w}_{Ci,j}} \quad (13)$$

And the energy capacitively stored in the power converter 2 is the sum of all the energies stored in the capacitors of the submodules 4 of the power converter 2.

Figure 11:
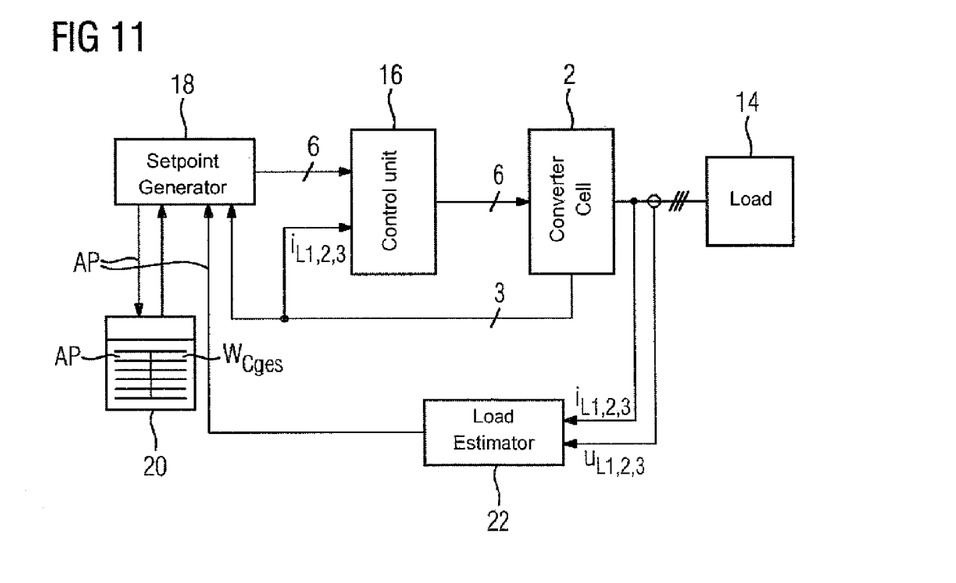
FIG. 11 shows a block diagram of a modified circuit arrangement according to FIG. 10.

FIG. 11 shows an advantageous embodiment of the control device according to FIG. 10 in greater detail. This advantageous embodiment of the control device differs from the embodiment in FIG. 10 in that a load estimator 22 is provided which calculates its operating point AP from measured current and voltage values of $i_{L1}$, $i_{L2}$, $i_{L3}$ and $u_{L1}$, $u_{L2}$, $u_{L3}$ of the load 14. This calculated operating point AP of the load 14 is fed to the setpoint generator 18 which uses it to select an associated average value of the capacitor energy $\overline{w}_{Ci,j}$.

The use of the inventive method in which the average value of the capacitor energy $\overline{w}_{Ci,j}$ no longer remains constant for all the operating points AP of the load 14 and/or the operating mode of the modular multi-level power converter 2, but is varied as a function of the operating points AP of the load 14 and/or the operating modes of the multi-level power converter 2 ensures that the required minimum capacitance value of all the submodules 4 of the modular multi-level power converter 2 is significantly reduced. This not only reduces the capacitor cost/complexity of each submodule 4 of the modular multi-level power converter 2, but because of the smaller size of the submodules 4 likewise reduces the mechanical and design complexity for implementing a three-phase modular multi-level power converter 2.

The invention claimed is:

1. A method for operating a multi-phase modular multi-level power inverter having two DC voltage input terminals and AC phase voltage output terminals connected to a load, a plurality of phase modules connected between the DC voltage input terminals, each phase module composed of valve arms connected in series at a connection point forming an AC phase voltage output terminal which is connected to a load, each valve arm having a plurality of power inverter cells comprising turn-off semiconductor switches and a choke connected in series, the method comprising:

controlling, with a control device, the turn-off semiconductor switches of each power inverter cell as a function of a plurality of setpoint values, wherein the setpoint values are generated such that a time-averaged energy value stored in a capacitor of the corresponding power inverter cells is predetermined by at least one of an operating point of the load and an operating mode of the modular multi-level power inverter, said time-averaged stored energy value determined for at least one of an operating point of the load and an operating mode of the modular multi-level power inverter stored in a table in a storage unit.

2. The method of claim 1, wherein a time-averaged stored energy value associated with the stored energy is predetermined as a function of the operating point.

3. The method of claim 1, wherein a time-averaged stored energy value associated with the stored energy is predetermined as a function of the operating mode of the modular multi-level power inverter.

4. The method of claim 1, wherein the time-averaged stored energy value is calculated offline.

5. The method of claim 1, wherein the time-averaged stored energy value is calculated online.

6. The method of claim 1, wherein setpoint values of the time-averaged stored energy values are predetermined for all power inverter cells of the multi-phase modular multi-level power inverter.

7. The method of claim 1, wherein setpoint values of the time-averaged stored energy values are predetermined for all power inverter cells of a valve arm of the multi-phase modular multi-level power inverter.

8. The method of claim 1, wherein the operating point of the load is determined from measured values of the load.

9. The method of claim 8, wherein the measured values of the load comprise load currents and power inverter phase output voltages.

* * * * *